(12) United States Patent
Smith et al.

(10) Patent No.: US 7,552,139 B2
(45) Date of Patent: Jun. 23, 2009

(54) REPRESENTED OBJECT GROUPS

(75) Inventors: Ian E. Smith, San Francisco, CA (US); Victoria M. E. Bellotti, San Francisco, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 09/812,037

(22) Filed: Mar. 19, 2001

(65) Prior Publication Data

US 2003/0105765 A1    Jun. 5, 2003

(51) Int. Cl.
*G06F 17/00* (2006.01)
(52) U.S. Cl. ............... 707/103 R; 707/3; 707/101; 707/102; 707/104.1
(58) Field of Classification Search ............ 707/100, 707/101, 102, 2, 3, 5, 104.1, 103 Y, 9, 103 R; 345/775, 422; 382/225; 706/62; 704/9; 715/733; 709/224
See application file for complete search history.

(56) References Cited

U.S. PATENT DOCUMENTS

| | | | | |
|---|---|---|---|---|
| 5,454,050 A | * | 9/1995 | Nakabayashi et al. | 382/165 |
| 5,544,303 A | * | 8/1996 | Maroteaux et al. | 715/733 |
| 5,574,909 A | * | 11/1996 | Misono et al. | 707/1 |
| 5,751,351 A | * | 5/1998 | Mogi | 348/239 |
| 5,752,027 A | * | 5/1998 | Familiar | 707/103 R |
| 5,761,429 A | * | 6/1998 | Thompson | 709/224 |
| 5,784,061 A | * | 7/1998 | Moran et al. | 345/863 |
| 5,831,617 A | * | 11/1998 | Bhukhanwala | 345/839 |
| 5,884,306 A | * | 3/1999 | Bliss et al. | 707/7 |
| 5,894,333 A | * | 4/1999 | Kanda et al. | 348/597 |
| 5,995,978 A | * | 11/1999 | Cullen et al. | 707/104.1 |
| 6,072,904 A | * | 6/2000 | Desai et al. | 382/225 |
| 6,076,106 A | * | 6/2000 | Hamner et al. | 709/223 |
| 6,092,072 A | * | 7/2000 | Guha et al. | 707/101 |
| 6,101,506 A | * | 8/2000 | Ukai et al. | 707/203 |
| 6,115,702 A | * | 9/2000 | Reiser et al. | 706/62 |
| 6,238,106 B1 | * | 5/2001 | Rosati | 345/204 |
| 6,240,423 B1 | * | 5/2001 | Hirata | 707/104.1 |
| 6,393,427 B1 | * | 5/2002 | Vu et al. | 707/101 |
| 6,484,161 B1 | * | 11/2002 | Chipalkatti et al. | 707/3 |
| 6,492,987 B1 | * | 12/2002 | Morein | 345/422 |
| 6,513,035 B1 | * | 1/2003 | Tanaka et al. | 707/3 |
| 6,522,330 B2 | * | 2/2003 | Kobayashi | 345/467 |
| 6,598,054 B2 | * | 7/2003 | Schuetze et al. | 707/103 R |

(Continued)

OTHER PUBLICATIONS

Jain et al., "Data Clustering: A Review", ACM, Mar. 1999, pp. 264-323.*

(Continued)

*Primary Examiner*—Thuy N Pardo
(74) *Attorney, Agent, or Firm*—Fliesler Meyer LLP

(57) ABSTRACT

A method, system and article of manufacture for organizing and grouping objects is provided. By assigning property names and values to a plurality of related objects, they may be organized into a group and one object of the group may be displayed as the representative. Grouping objects and displaying a representative provides a single way to keep objects organized, keep "reminders" of things to do or future events, all accessible through a central interface, and reduces the amount of display and storage space required to view and store all the objects. Additionally, the group of objects may be treated as a single document and the representative returned as a result of a search where one of the objects meets the search parameters.

32 Claims, 13 Drawing Sheets

U.S. PATENT DOCUMENTS

| | | | |
|---|---|---|---|
| 6,754,675 B2* | 6/2004 | Abdel-Mottaleb et al. | 707/104.1 |
| 6,941,321 B2* | 9/2005 | Schuetze et al. | 707/103 R |
| 7,107,268 B1* | 9/2006 | Zawadzki et al. | 707/9 |
| 7,233,952 B1* | 6/2007 | Chen | 707/100 |
| 7,275,061 B1* | 9/2007 | Kon et al. | 707/102 |
| 7,373,292 B1* | 5/2008 | Coyne et al. | 704/9 |

OTHER PUBLICATIONS

Mostafa et al., "A Multilevel Approach to Intelligent Information Filtering: Model, System, and Evaluation", Oct. 1997, pp. 368-399.*

Robert W. Bowdidge et al., "Supporting the restructing of data abstractions through manipulation of a program visualization", ACM, 1998, pp. 109-157.*

Jed Lengyel et al., "Rendering with coherent layers", ACM, Aug. 1997, pp. 1-10.*

Barreau, D., & Nardi, B., *Finding and Reminding: File Organization from the Desktop*, SIGCHI Bulletin, vol. 27, No. 3, p. 39-43 (Jul. 1995).

Beyer, H. & Holtzblatt, K., *Contextual Design: Defining Customer-Centered Systems*, Morgan Kaufman, CA, 1998.

Carroll, J. & Rosson, M.B., *Paradox of the Active User*, in J. Carroll (Ed.) Interfacing Thought: Cognitive Aspects of Human-Computer Interaction. The MIT Press, 1987.

Cole, I. *Human Aspects of Office Filing: Implications for the Electronic Office*, in Proceedings of Human Factors Society (Seattle, WA, 1982), p. 59-63.

Dourish, P., Edwards, K., LaMarca, A. & Salisbury, M., *Presto: An Experimental Architecture for Fluid Interactive Document Spaces*, in ACM Transactions on Computer-Human Interaction, vol. 6, No. 2 (Jun. 1999).

Freeman, et al., *The Lifestreams Software Architecture*, Ph.D. Dissertation, Yale University Department of Computer Science, May 1997, 173 pages.

Heiner, J., Hudson, S. & Tanaka, K., *Linking and Messaging from Real Paper in the Paper PDA*, CHI Letters, vol. 1, No. 1, p. 179-186, Nov. 1999.

Kidd, A., *The Marks are on the Knowledge Worker*, in Proceedings of CHI94 (Boston MA, Apr. 1994) ACM Press, p. 186-191.

Lansdale M. "*The Psychology of Personal Information Management*," Applied Ergonomics, 19, p. 55-66. Mar. 1988.

Mackay, W. *More than Just a Communication System: Diversity in the Use of Electronic Mail*, in Proceedings of CSCW'88 (Portland, OR, Sep. 1988). ACM Press, p. 344-353.

Malone, T. *How do people organize their desks? Implications for the Design of Office Information Systems*, ACM Transactions on Office Information Systems, 1, p. 99-112, Jan. 1983.

Mander, R., Salomon, G., and Wong, Y., *A 'Pile' Metaphor for Supporting Casual Organization of Information*, in Proceedings of CHI'92 (Monterey, CA, May 1992) ACM Press, p. 627-634.

Marchionini, G., *Information-Seeking Strategies of Novices Using a Full-Text Electronic Encyclopedia*, Journal of the American Society for Information Science. 40(1), p. 54-66, Jan. 1989.

Payne, S., *Understanding Calendar Use*, Journal of Human-Computer Interaction, vol. 8, No. 2 (1993), p. 83-100.

Strauss, A. & Corbin, J., *Basics of Qualitative Research*. Sage Publications, 1998.

Trigg, R., Blomberg, J. & Suchman, L., et al., *Moving Document Collections Online: The Evolution of a Shared Repository*, in proceedings of ECSCW '99, Kluwer Academic Publishers, p. 331-350, Sep. 1999.

Whittaker, S., & Sidner C., *Email Overload: Exploring Personal Information Management of Email*, in Proceedings of Chi 96, p. 276-293, Apr. 1996.

* cited by examiner

| | ADDRESS | SELLER'S AGENT | BUYER'S AGENT | CLOSING PRICE |
|---|---|---|---|---|
| 210 → | 12 Courtland Ave. | Joe Smith | Al Abramson | 465,000 |
| 220 → | 564 Elsie St. | Ed Edwards | Chris Cambron | 780,000 |
| 230 → | 908 California St. | Chris Cambron | Delia Dunston | 2,000,000 |
| 240 → | 1024 Market St. | Bill Brunswick | Joe Smith | 900,000 |
| 250 → | 8090 Ocean Ave. | Greg Gooch | Fred Funston | 280,000 |
| 260 → | 1313 Pacifica Ln. | Joe Smith | Ed Edwards | 750,000 |
| 270 → | 67 Teresita St. | Fred Funston | Chris Cambron | 300,000 |
| 280 → | 2317 Harris Ave. | Bill Brunswick | Joe Smith | 890,000 |
| 290 → | 1111 N. Travis | Bill Brunswick | Joel White | 145,000 |

| Property Names | Property Values |
|---|---|
| Address | 1024 Market St. |
| Buyers Agent | Bill Brunswick |
| Seller's Agent | Joe Smith |
| Closing Price | 900,000 |
| Group Number | {15, 93} |
| Group 15 Representative | True |
| Group 93 Representative | False |

FIG. 4

| ADDRESS | SELLER'S AGENT | BUYER'S AGENT | CLOSING PRICE |
|---|---|---|---|
| +·1024·Market·St. | Bill·Brunswick | Joe·Smith | 900,000 |
| +·564·Elsie·St. | Ed·Edwards | Chris·Cambron | 780,000 |
| 8090·Ocean·Ave. | Greg·Gooch | Fred·Funston | 280,000 |
| 1111·N.·Travis | Bill·Brunswick | Joel·White | 145,000 |

FIG. 6

| ADDRESS | SELLER'S AGENT | BUYER'S AGENT | CLOSING PRICE |
|---|---|---|---|
| 240a → + 1024 Market St. | Bill Brunswick | Joe Smith | 900,000 |
| 210a → 12 Courtland Ave. | Joe Smith | Al Abramson | 465,000 |
| 260a → 1313 Pacifica Ln. | Joe Smith | Ed Edwards | 750,000 |
| 2317 Harris Ave. | Bill Brunswick | Joe Smith | 890,000 |
| 280a → + 564 Elsie St. | Ed Edwards | Chris Cambron | 780,000 |
| 8090 Ocean Ave. | Greg Gooch | Fred Funston | 280,000 |
| 1111 N. Travis | Bill Brunswick | Joel White | 145,000 |

| ADDRESS | SELLER'S AGENT | BUYER'S AGENT | CLOSING PRICE |
|---|---|---|---|
| + 1024 Market St. | Bill Brunswick | Joe Smith | 900,000 |
| 2317 Harris Ave. | Bill Brunswick | Joe Smith | 890,000 |
| 1111 N. Travis | Bill Brunswick | Joel White | 145,000 |

1100

240c → +1024 Market St.
280c → 2317 Harris Ave.
290 ↗ 1111 N. Travis

FIG. 11

REPRESENTED OBJECT GROUPS

FIELD OF THE INVENTION

The present invention relates to organizing a plurality of objects, and more particularly to grouping some or all of the plurality of objects.

BACKGROUND OF THE INVENTION

The supply and availability of information has increased in the past years. With this increased availability of information individuals researching a specific topic may be bombarded with a large list of information pertaining to the topic. For example, a user researching the final closing papers of all the home sales in San Francisco in the year 2000, may obtain a list of thousands of results.

Currently, it is difficult for a user to organize or group this information down to a more manageable size without deleting some information, or breaking the large list into smaller, individual lists. Either way it is difficult to organize all the information within the original document in a more manageable form.

In addition to the increase in availability of information, individuals often have a large number of different types of information which they wish to keep organized in a particular fashion. This information may be, for example, e-mails found in a individual's e-mail application, documents, files, databases, contents within databases, and newsgroup information.

Currently, a typical way to organize these types of information is to either create folders and place the e-mails, documents, files, databases, newsgroup and other information into the desired folder or print the information out and store a hard copy. In either solution the documents are moved or copied from their original location, thereby increasing the likelihood that some or all of them may be lost, misplaced, or forgotten. Additionally, organizing or grouping information found within a database or spreadsheet without creating additional spreadsheets or databases for the specific information is difficult to do using current systems.

In addition to the increased need to organize information of the same type, such as e-mails, documents, or files, there is also a need for individuals to be able to easily organize or group objects of different types into one group, which may be easily accessed. For example, an individual preparing for a meeting may receive ten e-mails from colleagues regarding the meeting, and download information or documents from the Internet that will be used in the meeting. Current techniques for organizing this information include printing all the information out and storing it together, taking up valuable work space, and again increasing the likelihood of the information being lost, misplaced or forgotten, or saving the emails as files and create a folder on a computer and store all the information there. Alternatively, an individual may store all the Internet files or documents in one location and store the e-mails in a created folder.

There are a number of disadvantages with the current techniques for organizing information.

First, it is currently difficult to organize or group information of the same or different types without creating a separate folder and storing the information in the folder. In addition to the likelihood of possibly losing, misplacing, or forgetting the information, it is difficult to keep "reminders" of the topics, which these objects were organized for, in a central location for easy reference. Having to place the information in one or sometimes multiple folders increases the complexity of organization.

Second, it is currently difficult to designate a single object as a representative for a group of objects when displaying a set. Being able to display only one object for a group simplifies organization and reduces the amount of needed display space.

Third, current types of collections behave very differently from individual pieces of information. For example, although one piece of information can be part of different collections, it is difficult to treat a grouped set of information, or a folder of information as inseparable during searches or other mechanisms by which documents are found. In other words, folders or collections cannot "represent" a specific piece of information as the result of a search.

Fourth, it is currently difficult to retrieve information related to a topic unless that information contains specific search terms or properties. For example, if searching for all information related to an upcoming meeting using the search term "meeting," it is currently difficult to obtain relevant information if the information does not contain the search term "meeting."

Therefore, it is desirable to produce a system which can organize and group pieces of information, whether they be e-mails, documents, files, databases, spreadsheets, or portions thereof. Additionally, it is desirable to produce a system which provides easy access to the organized information in a central interface in such a way that the needed display space is reduced. Also, such a system which reduces complexity, increases organization, and provides the ability to return a representative of a group as the result of a search is desirable.

SUMMARY OF THE INVENTION

The present invention allows people to organize information, files, and other objects easily, and retain a representative of the objects which both represents the objects as a group and serves as a reminder for the person.

An embodiment of the invention, roughly described, comprises a method of organizing a plurality of objects. The method may include the steps of, selecting a first and second object from the plurality of objects, creating a group from the first and second objects, designating one of the selected objects as a representative of the group, and, displaying the representative of the group with the plurality of objects.

According to an embodiment of the present invention, the objects being grouped may be part of more than one group.

According to still another embodiment of the present invention, the step of designating a representative is performed by designating the first object selected during the step of selecting first and second objects.

According to yet another embodiment of the present invention, the step of displaying the representative of the group further includes not displaying the other objects of the group, and indicating that the object being displayed is a representative of the group.

According to another embodiment of the present invention, the method for organizing a plurality of objects described above, further includes the steps of, detecting a third object, and adding the third object to the group, responsive to the detecting step.

According to an embodiment of the present invention, the objects of the group may be viewed by selecting the representative.

According to another embodiment of the present invention, the objects of the group will be treated as a single object such that when a search is performed on the plurality of objects the representative will be returned if any of the objects of the group meet a search parameter.

According to another embodiment of the present invention, an article of manufacture including an information storage medium wherein is stored information for programming a computer to perform a method of organizing a plurality of objects is provided. The method may include the steps of, selecting a first and second object from the plurality of objects, creating a group from the first and second objects, designating one of the selected objects as a representative of the group, and displaying the representative of the group with the plurality of objects.

According to still another embodiment of the present invention, an apparatus for organizing a plurality of objects is provided. The apparatus includes, among other things, a processor, a display device in communication with the processor, and, a processor readable storage medium in communication with the processor, containing process readable program code for programming the apparatus to perform the method of organizing a plurality of objects. The method of organizing a plurality of objects may include the steps of, selecting a first and second object from the plurality of objects, creating a group from the first and second objects, designating one of the selected objects as a representative of the group, and displaying the representative of the group with the plurality of objects.

BRIEF DESCRIPTION OF THE FIGURES

These features and embodiments of the present invention will become clear from the following description taken in conjunction with the preferred embodiments thereof with reference to the accompanying drawings throughout which like parts are designated by like reference numerals, and in which:

FIG. 2 is a block diagram of a typical list of objects, in accordance with an embodiment of the present invention;

FIG. 4 is a block diagram of property names and values of a second object, in accordance with an embodiment of the present invention;

FIG. 6 is a block diagram of a list of objects, wherein a portion of the objects are represented by a group representative, in accordance with an embodiment of the present invention;

FIG. 7 is a block diagram of a list of objects which includes a group representative and the objects of the group, in accordance with an embodiment of the invention;

DETAILED DESCRIPTION

Embodiments of the present invention provide a system and method for organizing information in an efficient manner and providing access to the information through an interface. In accordance with the discussion herein, an "object" is defined as a file, document, e-mail, record, database, spreadsheet, newsgroup, link, URL ("Uniform Resource Locator"), proxy, address, identification, or any other piece of information that an individual may wish to be able to access in an organized manner, or any portions thereof. A "set" as defined herein may be any list, compilation or conglomeration of any number of objects. For example, FIG. 2 represents a set 200 of objects 210, 220, 230, 240, 250, 260, 270, 280, and 290. The set in FIG. 2 is an example of a portion of a result of the closing papers of the home sales in San Francisco in the year 2000. It will be understood that the objects of a set need not be all of the same type or format and may be stored in different locations so long as they are accessible by the system.

System Overview

In one embodiment, the present invention comprises a program which is specifically designed to operate within an existing application, irrespective of the application type, data, information or configuration. For example, the invention may be configured to function within an e-mail application (client or server), any type of file storage system, or within a database program. In an embodiment, the invention may also be configured to function over a network, such as the Internet, in communication with multiple applications and computers, organizing and grouping web pages, proxies, and other types information.

In another embodiment of the invention, the system is designed to operate on any type of storage infrastructure which allows objects to be noted by the storage system for later recovery. Such a storage system maybe a file system, database or a property based storage structure. A property based storage structure may be one as described in U.S. patent application Ser. No. 09/614,046, titled "System, Method, And Article Of Manufacture For Providing An Attribute System With Primitive Support Of Dynamic And Evolvable Roles In Support Of Fluid And Integrative Application Development" filed Jul. 11, 2000, which is herein incorporated by reference, Windows 2000, or the file system of the Beos (www.be.com).

Figure 1:
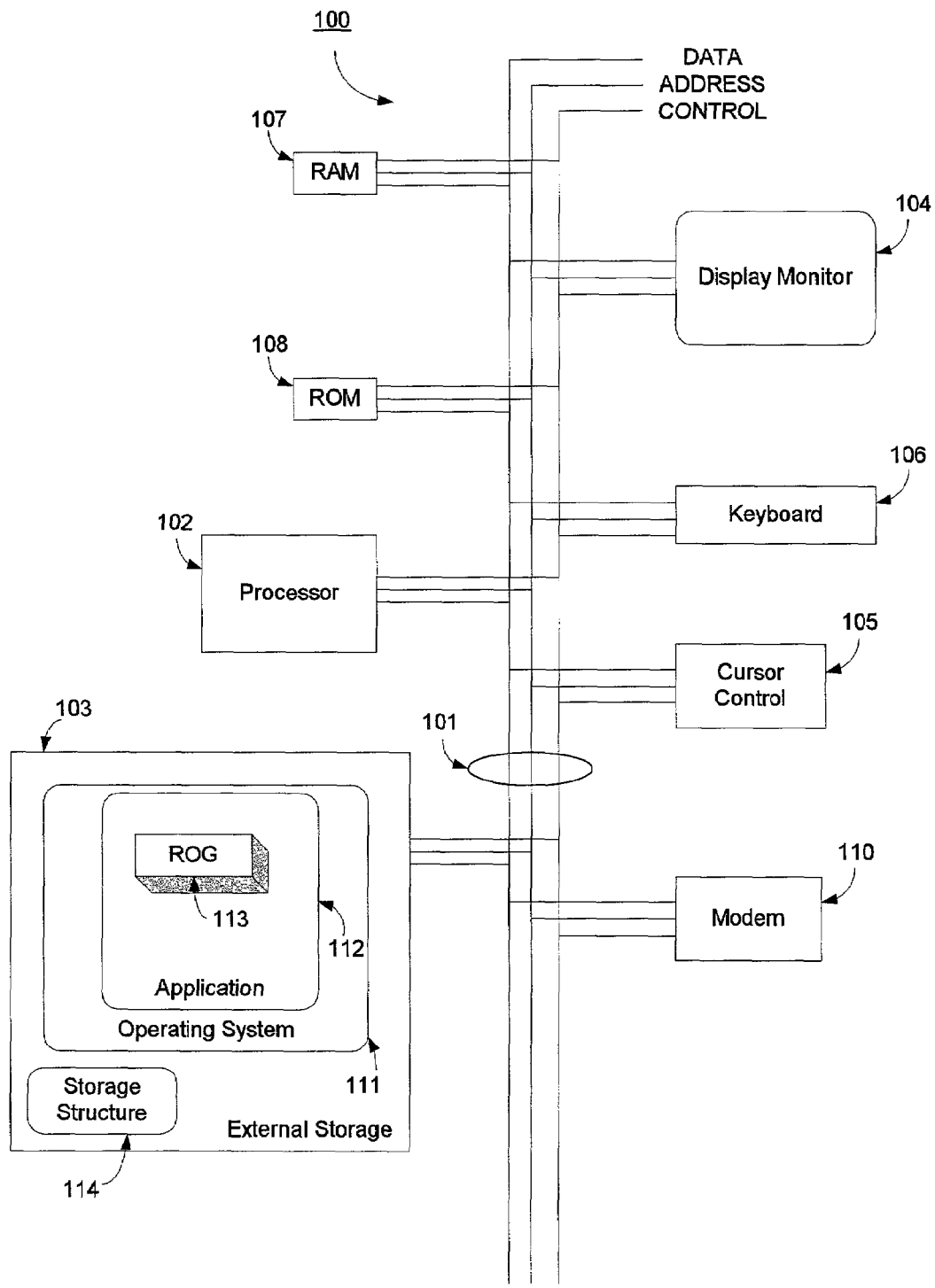
FIG. 1 is a block diagram of a general purpose computer suitable for performing embodiments of the present invention.

FIG. 1 illustrates a general purpose computer architecture 100 suitable for implementing embodiments of the present invention. The general purpose computer 100 includes at least a microprocessor 102, a display monitor 104, and a cursor control device 105. The cursor control device 105 can be implemented as a mouse, a joy stick, a series of buttons, or any other input device which allows a user to control the position of a cursor or pointer on the display monitor 104. The general purpose computer may also include random access memory 107, external storage 103, ROM memory 108, a keyboard 106, and a modem 110. All of the elements of the general purpose computer 100 may be tied together by a common bus 101 for transporting data between the various elements. The bus 101 typically includes data, address, and control signals. Although the general purpose computer 100 illustrated in FIG. 1 includes a single data bus 101 which ties together all of the elements of the general purpose computer 100, there is no requirement that there be a single communication bus 101 which connects the various elements of the general purpose computer 100. For example, the microprocessor 102, RAM 107, and ROM 108 might be tied together with a data bus while the external storage 103, modem 110, keyboard 106, display monitor 104, and cursor control device 105 are connected together with a second data bus (not shown). In this case, the first data bus 101 and the second data bus (not shown) could be linked by a bidirectional bus interface (not shown). Alternatively, some of the elements, such as the microprocessor 102 could be connected to both the first data bus 101 and the second data bus (not shown) and communication between the first and second data bus would occur through the microprocessor 102.

In an embodiment the external storage 103 would include an operating system 111, such as Microsoft Windows, which is capable of executing programs, and applications 112, such as e-mail applications, newsgroups, and file management applications.

In an embodiment, the present invention is configured as a Represented Object Group software program 113, which is capable of functioning within any of these applications without altering the applications itself. For example, Represented Object Group software program 113 may be implemented within a typical e-mail application. In such an embodiment, the e-mail application behaves as normal, and the software program 113 allows a user to further manipulate, organize and group e-mails and attached documents within the e-mail application. In alternative embodiments, the Represented Object Group software program 113 may be configured as its own application and capable of accessing files, data, and other information through the general purpose computer 100.

As will be understood, embodiments of the present invention, such as a Represented Object Group software program 113, may be in the form of a software program, a software object, a software function, a software subroutine, a software method, a software instance, a code fragment, a hardware operation or user operation, singly or in combination.

In an embodiment, the external storage 103 stores information using a property based storage structure, such as the one described in U.S. patent application Ser. No. 09/614,046, titled "System, Method, And Article Of Manufacture For Providing An Attribute System With Primitive Support Of Dynamic And Evolveable Roles In Support Of Fluid And Integrative Application Development" filed Jul. 11, 2000, incorporated above, or the file storage system of Beos (www.beos.com).

In an embodiment of the present invention, these storage structures are implemented using an article of manufacture, such as a computer readable medium. For example, Beos may be stored in a magnetic hard disk, an optical disk, a floppy disk, CD-ROM (Compact Disk-Read Only Memory), RAM (Random Access Memory), ROM (Read Only Memory), or other readable or writeable storage technologies, singly or in combination.

Embodiments of the present invention are thus executable on any general purpose computing architecture such as the general purpose computer 100 of FIG. 1, but there is clearly no limitation that this architecture is the only one which can be used in implementing embodiments of the present invention.

In these storage structures, property names and associated property values can be assigned to a stored object. Property names and associated property values are maintained by the infrastructure. For example, a file whose name is "2001 Budget Information" in a file system such as Beos, may have a property name such as "importance" with a value "high" and "confidential until" with a value of "Dec. 31, 2001" associated with it. In property based storage systems, the name of the property and the value can usually be anything.

Groups

FIG. 2 illustrates objects 210-290 of set 200, which may be organized into "groups," in accordance with an embodiment of the present invention. For example, a group may be designated as the objects involving real estate agent Joe Smith, namely objects 210, 240, 260, and 280. In an embodiment, a group may be designated by a user going through the set of objects 200 and selecting the objects that they wish to be part of the group and then activating a group mechanism (not shown) which associates a property name and value with the selected objects.

Alternatively, in an embodiment, the system may have predefined parameters for designating objects containing specific key words as part of a group. For example, if a predefined parameter is designated to group all objects which contain the key words "Chris Cambron" into a group, the objects 220, 230, and 270 of FIG. 2 will be placed into a group and have a property name and value assigned to them, without the need of a user selecting the objects.

This process of grouping may be performed multiple times to create multiple groups and one object may be part of multiple groups. Each group will be a subsection of the larger set of objects. In an embodiment, sub-groups may be created from objects of an existing group. A group may be any collection of objects within a set, in any order, and the group may include as few as one and as many as all the objects of the set. Further, it is not necessary that every object of a set be made part of a group.

In an embodiment, the grouping mechanism is implemented using the storage structure described in U.S. patent application Ser. No. 09/614,046, titled "System, Method, And Article Of Manufacture For Providing An Attribute System With Primitive Support Of Dynamic And Evolveable Roles In Support Of Fluid And Integrative Application Development" filed Jul. 11, 2000, incorporated above.

In addition to having property names and values as described above, property based storage structures have the ability to maintain "hidden" properties associated with an object. These hidden properties are maintained for the purpose of the application itself rather than the user. These hidden properties are used by the system for storing names and values which associate objects when they are grouped.

Figure 3:
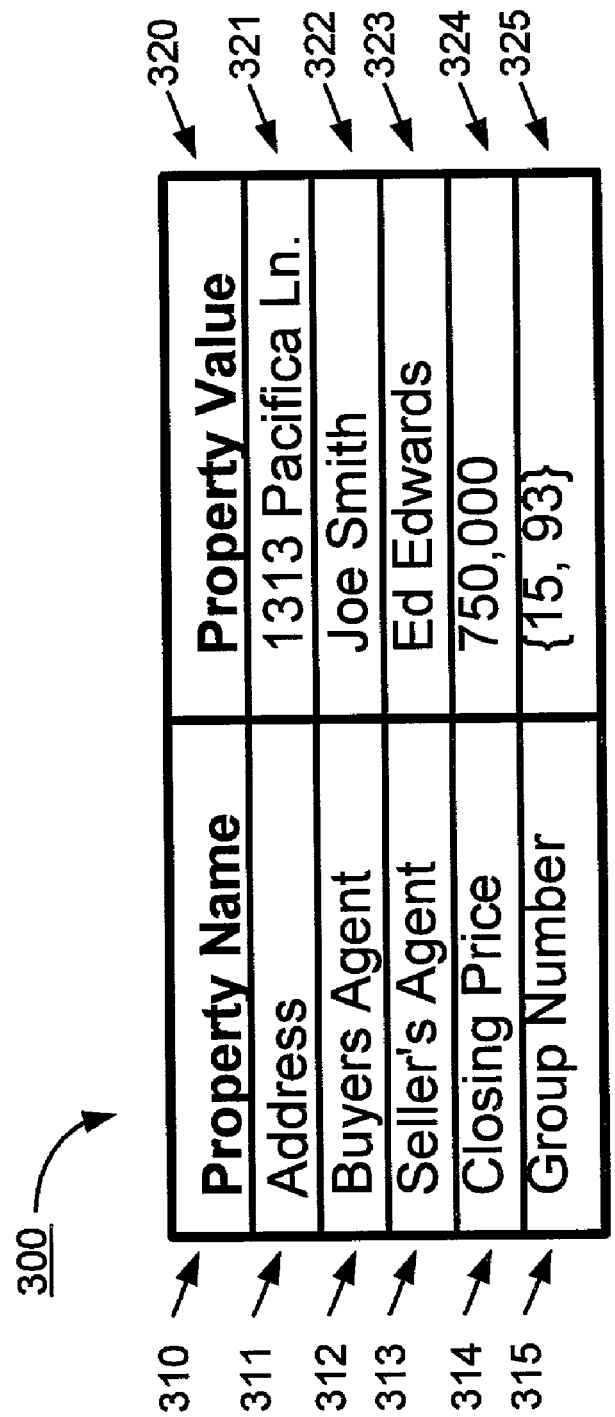
FIG. 3 is a block diagram of property names and values of a first object, in accordance with an embodiment of the present invention.

In an embodiment, hidden properties for designating groups will be referred to as having a property name "group number" 315 of FIG. 3. The hidden property value of group number 315 may be any value that is unique within the system's existing values of group number 315. FIG. 3 is a block diagram of property names 310 and property values 320 of object 260 of FIG. 2. Included are property names "Address" 311 having a value of "1313 Pacifica Ln." 321, "Buyer's Agent" 312 having a value of "Joe Smith" 322, "Sellers Agent" 313 having a value of "Ed Edwards" 323, "Closing Price" 314 having a value of "750,000" 324 and "Group Number" 315 having values of "15", and "93", 325. Group number 315 is a hidden property. Having values of 15 and 93 inform the system that the object, here object 260 of FIG. 2, is an object of both group 15 and group 93.

The values 325 of property name group number 315 are used internally by the system for determining which objects are part of a group, and there is no need to display the property name or value to a user. By only requiring a value for property name group number 315 for maintaining groups, an object may be associated with multiple groups by assigning additional values to property name group number 315.

It is often beneficial to assign an object to multiple groups for future reference purposes. For example, an object may contain information which relates to two different topics. Being able to assign multiple values to property name group number 315 allows an object to be assigned to each group without actually creating an individual copy for each group. Not only does this simplify organization, it reduces the amount of memory needed for storing multiple copies of the same object, which is often used in conventional systems.

In an embodiment, the system may include a table which lists which objects are part of a group. By keeping a table of which objects are part of a group, the system can quickly determine which objects belong to a group without scanning the property names and associated values of each object. For example, if a user selects objects 220, 250, 270, 280, and 290 to be part of the same group a table will be created which designates that objects, 220, 250, 270, 280, and 290 are all part of the same group.

Representatives

In an embodiment, once a group has been selected, one object of the group is designated as a "representative." A representative is the object that stands for, or represents all the other objects of a group when being displayed within a set. The representative also serves as a reminder to a user. Displaying only the representative for a group of objects improves organization and saves display space.

The amount of display space consumed by an application has become of increasing importance with the trend of smaller, portable devices. Individuals using a portable device to retrieve information often have a reduced amount of display space in which to view their information. By only displaying the representative of a group of objects instead of all the objects, the amount of display space needed to view the information is reduced. For example, if a user has 2,000 objects relating to three topics, which have been grouped into three groups, by only displaying the representatives of each group, a user can view all three topics within a small display area without the need to "scroll" through all 2,000 objects.

In an embodiment, the representative for a group of objects may be the object which is selected first when objects are being selected for the group. For example, if the user in selecting the objects as described in the example above were to select object 210 first, the representative of the group would be object 210. Thus, when displaying the grouped objects 210, 240, 260, and 280 along with the other objects of the original set 200, object 210 may be the only object from that group that is displayed.

By designating the first object selected for the representative the amount of user input is reduced. In this embodiment, the user only need select the objects that they desire to have grouped, and as it appears to the user, a representative is automatically selected.

In another embodiment, the representative may be selected based on patterns within the selected objects. For example, using the group created above, a pattern may be found that all the selected objects fall within a particular price range. Using this pattern a representative may be selected that most closely resembles the median price for the range, or the highest price, or the lowest price.

In an alternative embodiment, the system will request that the user designate which object of the selected objects should be used as the representative.

Still another embodiment for selecting a representative may include a combination of the above embodiments. In this embodiment, a user may be asked whether a representative should be automatically selected or whether the user should select a representative for the group. If the user designates that a representative should be automatically selected then one of the two automatic selection embodiments may be performed.

Once a representative has been chosen, similar to designating members of a group, a property name and value may be associated with the object to signify the object as the group representative. FIG. 4 is a block diagram of an embodiment of property names and values of object 240 of FIG. 2. Included in the property names 410 may be "group 15 representative" 416 having a value of "true" 426, and "group 93 representative" 417 having a property value of "false" 427. Since there is only one representative for a group, all the other members of group 15 will be assigned a property value of "false" for property name "group 15 representative" 416. By assigning a value of true or false to the above property name for each object of the group it is simple for the system to determine which object of the group is the representative by checking for the value of "true" for the property name "group 15 representative" 416 of each object.

As discussed above, an object may be the member of multiple groups. Using the above technique for designating an object as representative it remains possible that an object which is part of multiple groups may be a representative of one of the groups, some of the groups, all of the groups, or none of the groups. For example, if an object is a member of groups 15, 22, 48, and 93 it may have property names: "group 15 representative", "group 22 representative", "group 48 representative", and "group 93 representative". Each property name will be assigned a value of true or false. Thus, when searching one of the groups for the representative it is simple to determine whether an object is the representative for that group.

In an embodiment, the object which is the representative for a group may be changed at any time. Once a group is created and a representative assigned, a user may desire to use a different object as the representative for the group. This object may be an existing member of the group or a new object being added to the group.

Whatever the case, the representative of a group may be changed by changing the value assigned to the property name being used to designate the representative of the group. For example, a group may have property name "group 15 representative" 416 as the property name for indicating the representative. Referring to FIG. 4, object 240 currently has a value of true 426 assigned to property name group 15 representative 416, designating it as the representative of the group having a property value of 15 assigned to the property name group number. If a new object is to be the representative, property name group 15 representative 416 of object 240 will have its value changed from true 426 to false, thereby indicating that it is not the representative of the group. The new representative will have a value of true assigned to property name group 15 representative.

In an embodiment, the system may include a table, as described above, which keeps track of which object is the representative of a group. For example, if objects 230, 240, 260, and 280 are selected to be in the same group and object 230 is designated as the representative a table will include information that objects 230, 240, 260, and 280 are part of the same group and object 230 is the representative.

By grouping objects and assigning a representative, the list of objects making up a set may be displayed in a much more organized fashion.

Figure 5A:
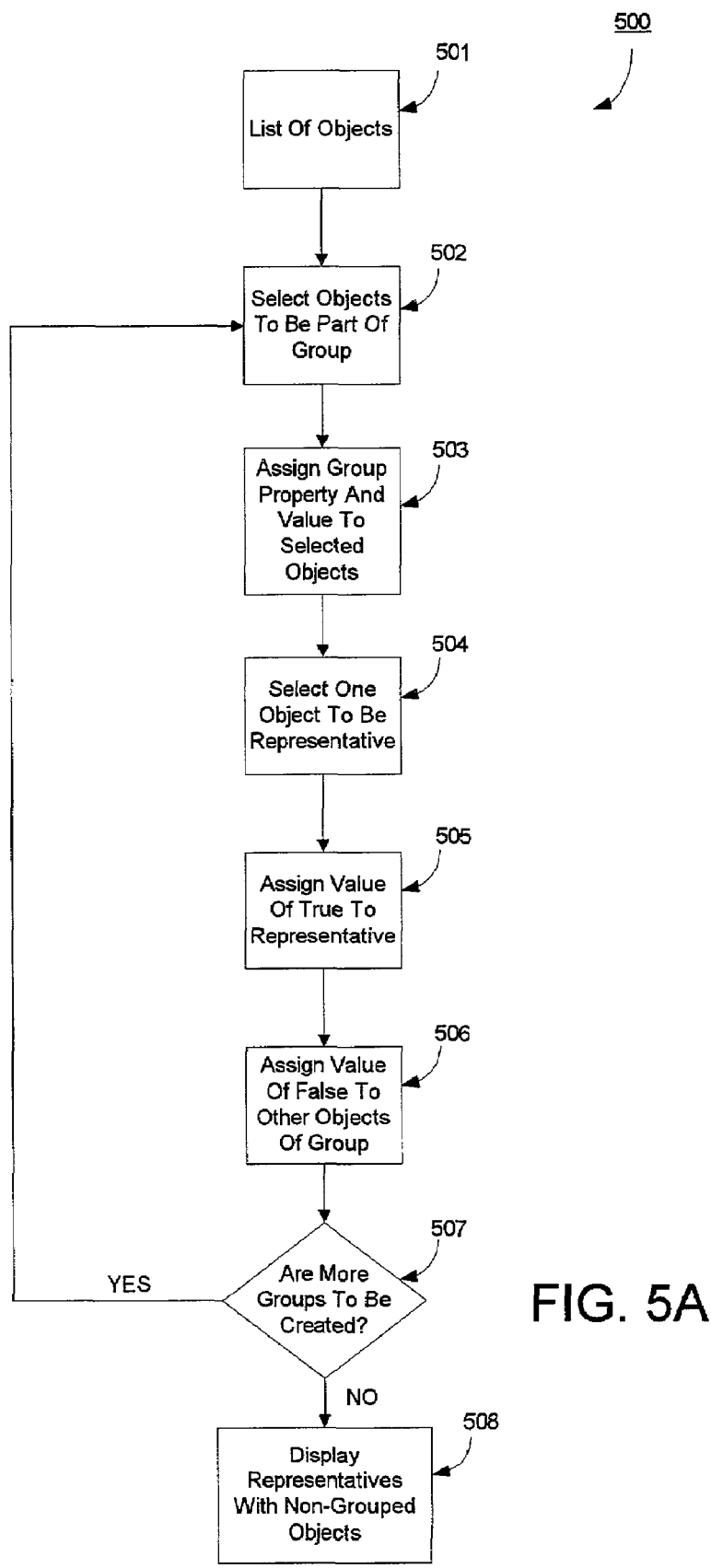
FIG. 5A is a flowchart for grouping objects and assigning a representative, in accordance with an embodiment of the present invention.

FIG. 5A illustrates a flowchart 500 for grouping objects and assigning a representative, according to an embodiment of the present invention.

As one who is skilled in the art would appreciate, FIGS. 5A, 5B, 8, 9A, and 9B illustrate logic boxes for performing specific functions. In alternative embodiments, more or fewer logic boxes may be used. In an embodiment of the present invention, a logic box may represent a software program, a software object, a software function, a software subroutine, a software method, a software instance, a code fragment, a hardware operation or user operation, singly or in combination.

In an embodiment of the present invention, the methods illustrated by FIGS. 5A, 5B, 8, 9A, and 9B are stored in an article of manufacture, such as a computer readable medium. For example, the methods may be performed using software stored in a magnetic hard disk, an optical disk, a floppy disk, CD-ROM (Compact Disk Read-Only Memory), RAM (Random Access Memory), ROM (Read-Only Memory), or other readable or writeable data storage technologies, singly or in combination.

The present invention may be used to group and organize any set or list of objects, represented as logic block 501, in FIG. 5A. As discussed above, this list may include objects of multiple types and may be any length.

Logic block 502 represents the different embodiments discussed above for selecting objects to be organized into a group. For example, this may be done by a user going through the list and selecting the objects that are desired to be made part of a group using the cursor control 105 or keyboard 106 and then selecting a group mechanism. Alternatively, if predefined parameters have been created, the system will select objects to be grouped based on these parameters.

Once the objects which are to be grouped have been selected in logic block 502, the selected objects are assigned a property name and associated value as illustrated in logic block 503. The property name and value may be any name and value which is used by the general purpose computer 100 to signify that the selected objects are part of a group. For example, the property name for a group may be "group number" and the assigned value may be "15." This value will indicate that each of the objects having property name group number with a value of 15 are part of the same group.

In an embodiment, in logic block 503, a table is also created which lists which objects are part of which group. By keeping a table, the system can quickly determine which objects have been organized into a group. Using the above example of assigning a property value of 15 to property name group number for the objects selected in logic block 502, a table will be created which includes a list of which objects have property value 15 assigned to property name group number.

After assigning a property name and value to the selected objects, control is passed to logic block 504. In logic block 504 one of the objects of the group is designated as the representative. Designating a representative may be performed using any of the embodiments discussed above for selecting a representative. For example, the representative may be designated as the first object that was selected by a user in logic block 502.

In logic blocks 505, and 506 a property name and value is assigned to the objects of the group created in logic blocks 502, and 503. Any property name may be assigned to the objects which will allow the system to determine which object of the group is the representative. For example, a property name of "group 15 representative" may be assigned to each object of the group created in logic block 503. In logic block 505 a value of "true" is assigned as the value to the object which is to be the representative of the group, as determined in logic block 504.

In logic block 506, the other objects of the group created in logic block 503 are assigned a value of "false" to property name "group 15 representative," thereby indicating that they are not the representative of the group. The value assigned to the property name for determining the group representative need not be true or false, but may be any value that will distinguish the group representative from the other objects of the group. For example, a value of 1 may be assigned to the property name group 15 representative for the object which is to be the representative and a value of 0 may be assigned to property name group 15 representative for the other objects of the group.

Additionally, in an embodiment in logic blocks 505 and 506, the table generated in logic block 503 will be augmented to include a reference as to which object in a group is the representative for the group.

In logic block 507 it is determined whether other groups are to be created from the list of objects illustrated by logic block 501. If it is determined in logic block 507 that additional groups are to be created, control is returned to logic block 502 and the process is repeated. Each time the process is repeated a new value for property name group number is assigned to the selected objects in logic block 503. By assigning a new value to the property name group number, one object may be a member of multiple groups. Additionally, each time the process is repeated a new property name and value is assigned to the selected objects for designating the representative of the group in logic blocks 505, and 506.

If it is determined in logic block 507 that no more groups are to be created control is passed to logic block 508.

In logic block 508 the representative for each group that was created during the process illustrated by logic blocks 501-507 is displayed on the display monitor 104 with objects of the list which are not part of a group. In an embodiment, the representatives being displayed on the display monitor 104 have a designation, such as a "+" to indicate that they are a representative of a group. By selecting a representative using cursor control 105, the objects which make up the group being represented by the selected representative may be displayed and accessed.

Displaying only the representative for a group of objects allows a user to view multiple groups within a small display area.

In an alternative embodiment, instead of assigning a value of true in logic block 505 to the object selected to be the representative in logic block 504 a pointer or shortcut is created which refers to the group of objects, and all of the objects are assigned a value of false in logic block 506. In logic block 508, instead of displaying an object as the representative of the group, the pointer is displayed as the representative of the group. The pointer will appear just as the object which was selected to be the representative in logic block 504. Thus, as it appears to a user the representative is actually being displayed. Providing a pointer as the representative for the group of objects allows a user to change the display appearance without actually altering any of the objects. For example, if a pointer is displayed which refers to objects 210, 240, 260, and 280 it may be altered by the user to only display "Joe Smith". Thus, using this embodiment a user may modify the appearance of the displayed representative without actually modifying any of the objects of the group.

Figure 5B:
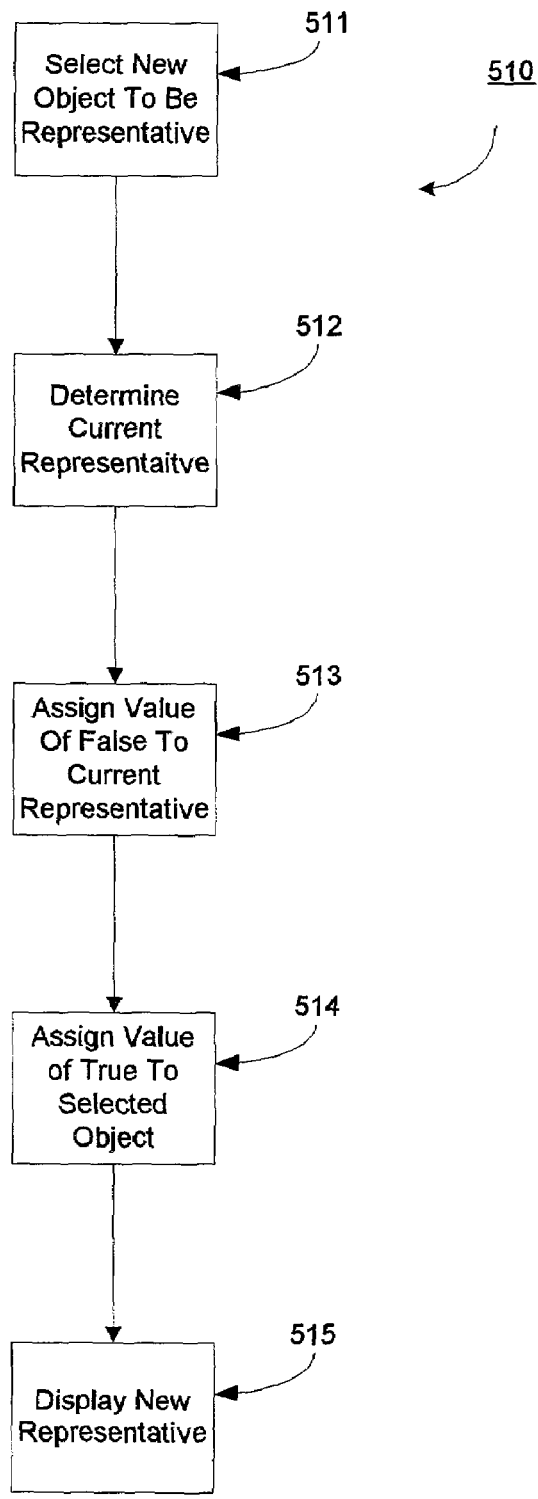
FIG. 5B is a flowchart for changing the representative of a group, in accordance with an embodiment of the present invention.

FIG. 5B illustrates a flowchart 510 for changing the representative of a group, according to an embodiment of the present invention.

In logic block 511 a user selects the object which is to be the new representative of the group.

Once an object has been selected to be the new representative of the group in logic block 511 the current representative of the group is determined, as illustrated by logic block 512. The current representative of the group will be the object having a value of true assigned to the property name being used to designate the group representative. For example, if property name group 93 representative is assigned to each object of a group, a value of true will be assigned to the object which is to be the representative. After the current representative is determined, control is passed to logic block 513.

In logic block 513 the object determined in logic block 512 to be the current representative, will have a new value of false assigned to the property name being used to designate it as the current group representative. Continuing with the above example, the object determined in logic block 512 as having a value of true assigned to property name group 93 representative will have a new value of false assigned to property name group 93 representative.

In logic block 514, the object selected in logic block 511 will have a value of true assigned to the property name being used to designate the group representative. Thus, continuing with the example, the object selected in logic block 511 will have a value of true assigned to property name group 93 representative. Additionally, in an embodiment using tables, the table will also be updated in logic block 514 to reference the new representative of the group. Once the property values for the property name being used to designate the representative have been changed in logic blocks 513, and 514, control is passed to logic block 515.

In logic block 515, the previous representative of the group is removed from the display monitor 104, and the new representative selected in logic block 511 is displayed on the display monitor 104, with the objects which are not part of a group. In an embodiment, the new representative being displayed will be displayed in a similar location to the previous representative. Additionally, the new representative being displayed may have properties similar to original representative, such as being displayed with a "+" indicating that it is a representative of a group, and being selectable.

FIG. 6 illustrates a condensed list of objects 600 which make up a set, wherein some of the objects are represented by a group representative 240a, in accordance with an embodiment of the present invention. For example, if all the objects of FIG. 2 which relate to Joe Smith have been grouped and have object 240 as their representative, only object 240a need be displayed along with the rest of the set. Object 240a includes a "+" to designate that it is the representative of a group. Not only does this make the entire set more manageable, it also saves the user's work of selecting every reference to Joe Smith for easy access at a later date. Once a user has prepared a group, as described above, the user may later return to the file or application and easily retrieve the results of their previous work. Additionally, since one of the objects has been designated as the representative, a user need not name the group, as they would if they used a more traditional tool such as a file system for storing the selected objects.

In an embodiment, by selecting object 240a, a user may view and access all the members of the group for which that object is the representative. Using the example above, which grouped all objects related to Joe Smith and designated object 240 as the representative, would result in an appearance similar to that of FIG. 6.

FIG. 7 represents a block diagram of the above example in which a user has selected object 240a of FIG. 6. Upon selection of object 240a, all the objects 210a, 260a, and 280a of that group will be displayed under the representative 240a. Making all of the objects of that group available in a central location increases organization and decreases the complexity of creating folders and moving objects to another location.

Adding New Objects to Existing Groups

Over time, additional objects may be added to a set which already includes groups. For example, a user may create groups which include e-mails and then another e-mail may be received. It may be desirable to add these new objects to already existing groups or create a new group for the objects.

Creating a new group for the objects may be performed using any of the above described embodiments.

In an embodiment, a new object may be added to an existing group by selecting the object, selecting the existing group, and activating a group object mechanism. The new object will then be assigned a property name and value which associates it with the existing group. Assigning a property name and value to the object may be performed using the system for assigning property names and values to objects as described above.

In an alternative embodiment, the new objects may be assigned to existing groups using pre-defined parameters. This system for assigning new objects to a group performs similar to the system described for assigning objects to a group using pre-defined parameters.

Figure 8:
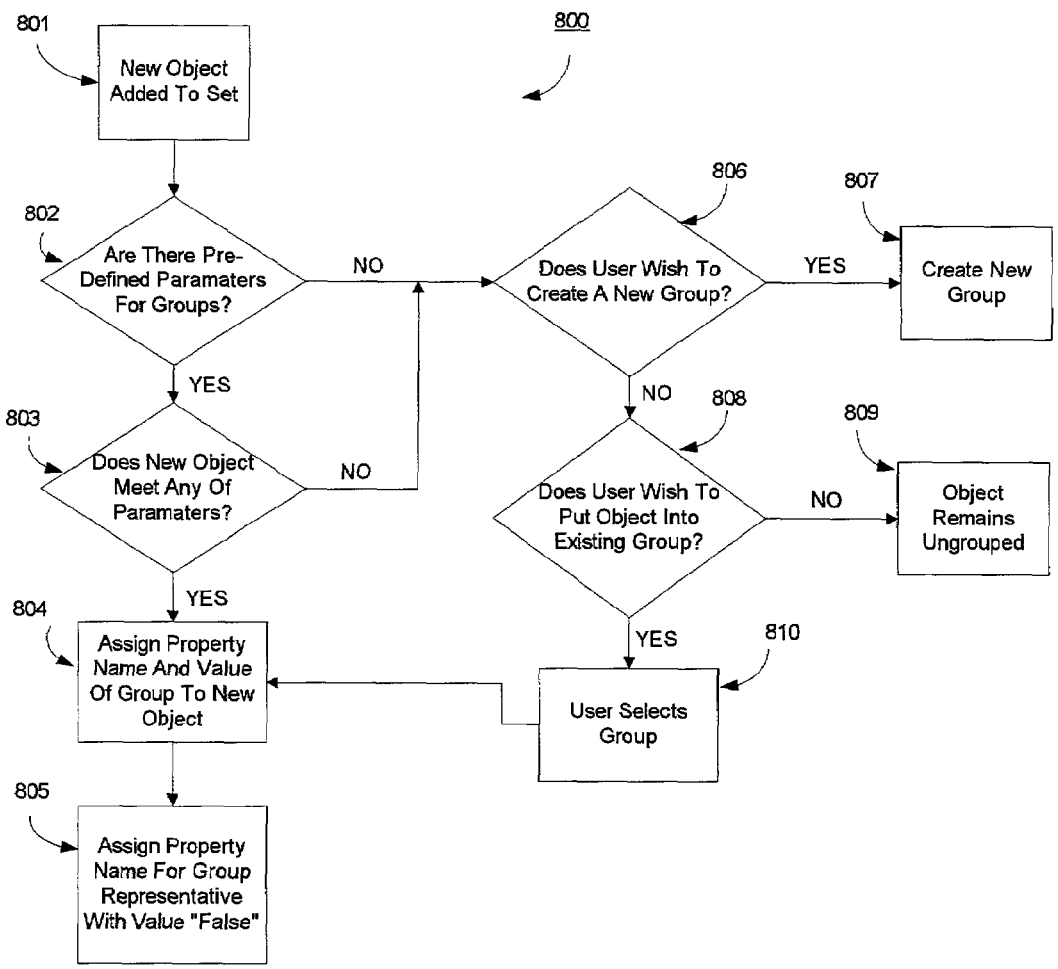
FIG. 8 is a flowchart for adding new objects to existing groups, in accordance with an embodiment of the present invention.

FIG. 8 illustrates a flowchart 800 for adding new objects to existing groups, according to an embodiment of the present invention.

Logic block 801 illustrates that the system has determined that a new object has been added to a pre-existing list of objects which already contain groups.

In logic block 802 it is determined whether there are pre-defined parameters for the existing groups which are to be used in assigning the new object to a group. If pre-defined parameters exist control is passed to logic block 803.

In logic block 803 the new object is searched to determine whether it meets any of the existing groups pre-defined parameters. Using the process of creating pre-defined parameters for groups, new objects may be added to a group without manual selection by a user. As it appears to the user, the new object will automatically be added to the proper group.

If it is determined in logic block 803 that the new object does meet the pre-defined parameters of one of the existing groups the property name and value for that group is assigned to the new object, thereby making the new object part of the group, as illustrated by logic block 804. In an embodiment, in logic block 804, the table listing the objects of each group is also updated to include the new object.

Additionally, the property name for indicating the group representative of the group is assigned to the new object and given a value of false, as illustrated by logic block 805. In an alternative embodiment, at logic block 805, a user may be requested whether the new object should be used as a new group representative for the group. If a user indicates that the new object is to be the new group representative it will be assigned a value of true and the previous representative for the group will be assigned a new value of false. In an embodiment, assigning the object as a new representative may be performed using the method described in FIG. 5B.

If however, it is determined in logic block 802 that there are no predefined parameters for the existing groups control is passed to logic block 806. Additionally, in logic block 803, if it is determined that the new object does not meet any of the pre-defined parameters of the existing groups control is passed to logic block 806.

In logic block 806 a user is requested to indicate whether a new group is going to be created for the new object. If a user indicates in logic block 806 that a new group will be created control is passed to logic block 807 and the process for creating groups illustrated by flowchart 500 of FIG. 5A is performed.

If a user indicates that a new group will not be created for the new object, the user, in logic block 808, is requested to indicate whether the new object is to be placed in an existing group. If the user does not wish to group the object with an existing group or create a new group control is passed to logic block 809 and the new object is displayed in display monitor 104 with the pre-existing list of objects.

In an embodiment, requests made to a user in logic blocks 806, and 808 may be performed simultaneously, allowing the user to select one or the other, or alternatively select that the new object is not to be grouped.

If it is determined in logic block 808 that the new object is to be placed in one of the existing groups control is passed to logic block 810.

In logic block 810, a user selects the group that the new object is to be placed in by selecting the group representative from the pre-existing list, using cursor control 105 or the keyboard 106. Upon selection of the group representative control is passed to logic block 804 and the process is completed as described above.

Searches

Once a group has been designated and a representative assigned the objects within that group may be treated as a single object. For example, if a key word search is performed using the key words "Bill Brunswick," instead of producing a result which contains every object within a set that includes the term Bill Brunswick, a list would be produced containing a representative of each group containing objects which include the search terms Bill Brunswick and objects which are not part of a group which contain the search terms. In an embodiment, the representatives would include an indication that they are representatives of a group wherein at least one of the objects of the group contains the term searched for.

Figure 9A:
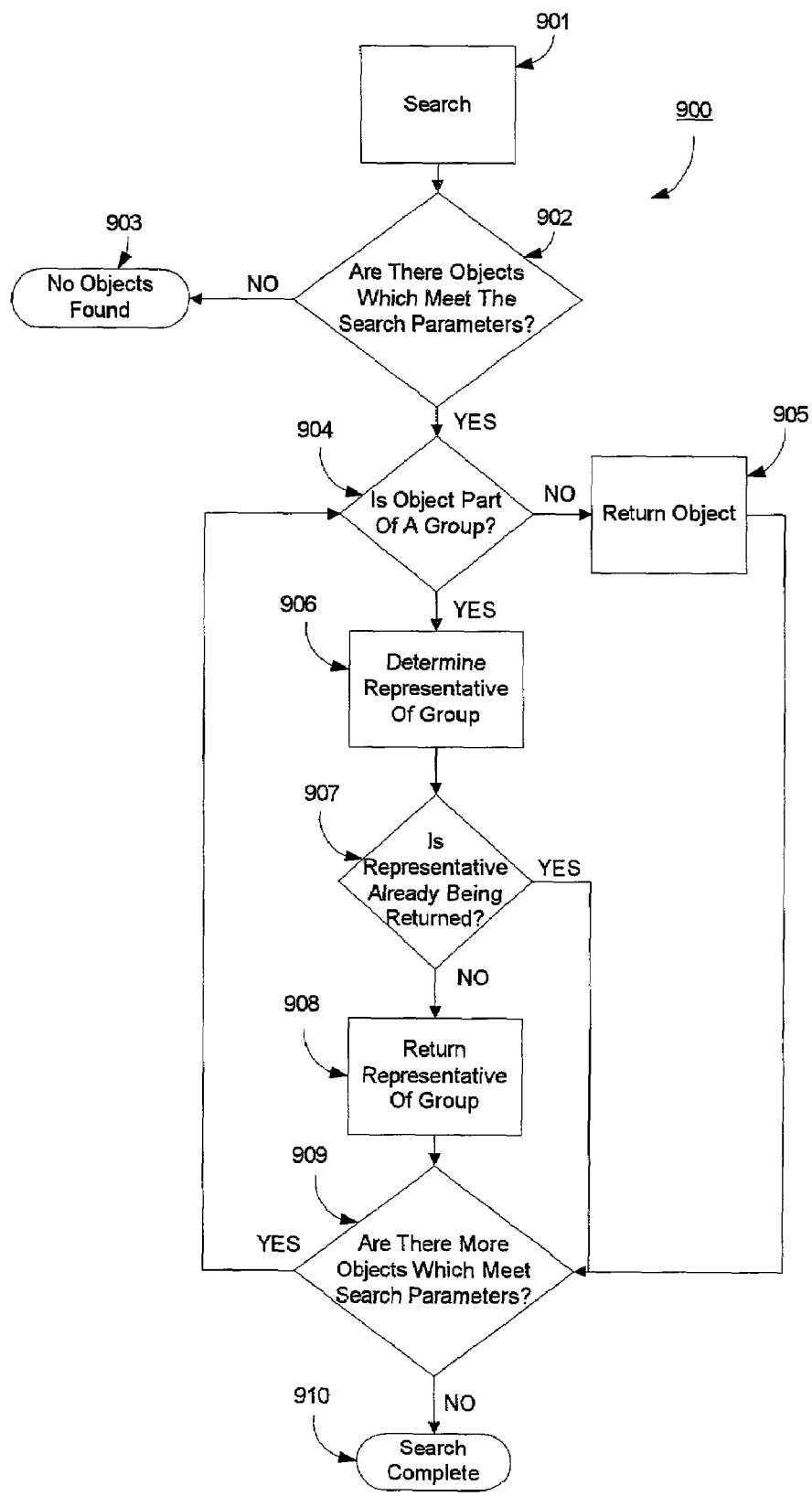
FIG. 9A is a flowchart for returning a representative of a group which contains an object that meets a search parameter, in accordance with an embodiment of the present invention.

FIG. 9A illustrates a flowchart 900 for returning a representative of a group which contains an object that meets the parameters of a search, according to an embodiment of the present invention.

Logic block 901 illustrates a search that has been requested to be performed on a list of objects which have been organized and some of which may have been grouped according to an embodiment of the present invention. For example, a search may be a keyword search, a search for objects based on their date of creation, or any other type of search.

In logic block 902 the list of objects are scanned to determine whether any of the objects meet the parameters of the requested search. These objects may be scanned using any method for searching objects. If it is determined in logic block 902 that there are objects which meet the parameters of the requested search, control is passed to logicblock904, otherwise a result of "no objects found" is returned in logic block 903 and the search is completed.

In logic block 904 it is determined whether the objects returned in logic block 902 are part of a group. As discussed above, if an object is part of a group the object will have a property name, such as group number, with a value indicating that it is part of a group.

If an object meeting the search parameters is not part of a group that object is returned and displayed on display monitor 104 as meeting the parameters of the search, as illustrated by logic block 905, and control is passed to logic block 910.

For each object determined to be part of a group in logic block 904 control is passed to logic block 906.

In logic block 906 the representative for the group the object belongs to is determined. Determining the representative may be performed by scanning each object of the group determined in logic block 904, and finding the object having a value of true associated with the property name used to designate the group representative. For example, if an object meeting the search parameters is found, and the property name "group number" for that object has a value of 15, every object of the list having a value of 15 for group number is part of the same group and will have a second property name such as "group 15 representative" having a value of "true" or "false" which is used to designate the group representative. The object having property name group 15 representative with a value of true is the representative for the group.

Alternatively, in an embodiment which includes a table, the representative of the group may be quickly determined by the system referencing the table. Using the above example of an object having a property value of 15 for property name group number, the system will reference a table to determine which object is the representative for objects having property name group number with a property value 15 assigned to it.

Once the representative is found in logic block 906, it is then determined in logic block 907 whether that representative is already being returned as a representative of a group which contains an object meeting the search parameters. If the representative is already being returned, logic block 908 is skipped and control is passed to logic block 909.

If however, it is determined in logic block 907 that the representative is not already being returned and displayed, control is passed to logic block 908. In logic block 908 the representative is returned and displayed on the display monitor 104, and control is passed to logic block 909.

In logic block 909 it is determined whether there are any more objects meeting the search parameters which have not yet had their representative returned and displayed. If there are more objects meeting the parameters of the search control is returned to logic block 904 and the process is repeated for the next object, otherwise control is passed to logic block 910 and the process is completed.

In an embodiment, each representative being displayed as a result of above process will include an indication that it is a representative of a group and how many objects of that group meet the search parameters. If the representative meets the parameters of the search this may also be indicated. Selecting the representative returned for the search using the cursor control 105 or the keyboard 104 allows viewing and access to each of the members of the group which meet the search parameters. Additionally, the other objects of the group may be viewed and accessed through the representative.

Allowing group representatives to be returned for an object of the group meeting the search parameters allows a user to easily recall what the object relates to and additionally obtain access to all the members of the group in a central location.

In some instances a user may desire to search for specific objects within a group, or a selected number of groups, rather than search all objects. This may be desirable if the group is large, or if the user is searching for a specific piece of information contained in only a few objects which the users knows are in a selected set of groups. In an embodiment, a search may be performed on a set of objects which make up a group, or on the objects of multiple groups which have been selected by a user.

Figure 9B:
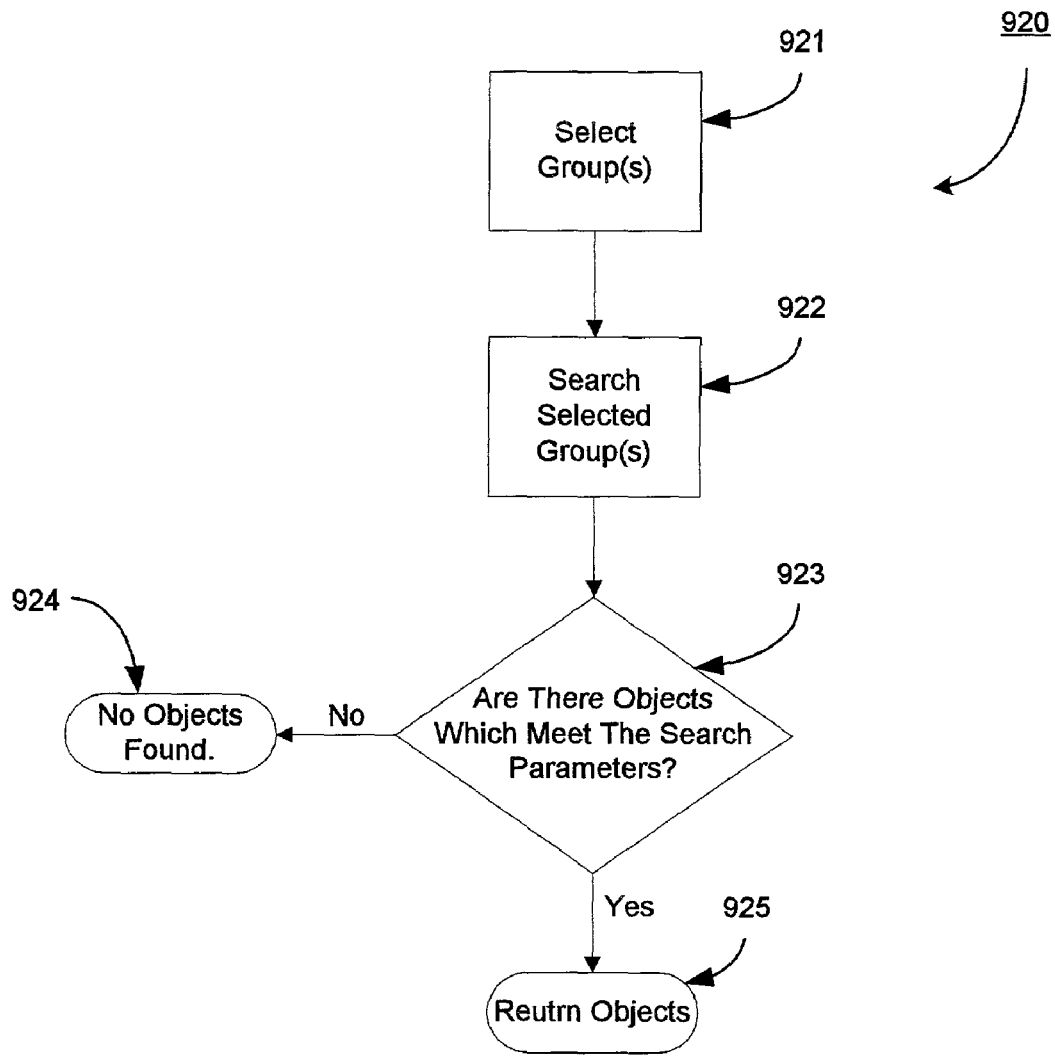
FIG. 9B is a flowchart for returning a list of objects, included in user selected groups, that meet the parameters of a search, in accordance with an embodiment of the present invention.

FIG. 9B illustrates a flowchart 920 for returning a list of objects, included in user selected groups, that meet the parameters of a search, according to an embodiment of the present invention.

In logic block 921 a user selects a number of groups which they desire to perform a search on. A user may select one or as many as all of the groups to perform the search on.

Logic block 922 illustrates a search that has been requested to be performed on the groups selected in logic block 921. For example, a search may be a keyword search, a search for objects based on their date of creation, or any other type of search.

In logic block 923 the objects of the selected groups are scanned to determine whether any of the objects meet the parameters of the requested search. These objects may be scanned using any method for searching objects. If it is determined in logic block 923 that there are objects which meet the parameters of the requested search, control is passed to logic block 925, otherwise a result of "no objects found" is returned in logic block 924 and the search is completed.

In logic block 925 the objects found in logic block 923 as meeting the search parameters are returned and displayed on display monitor 104 as meeting the parameters of the search, as illustrated by logic block 925, and the search is completed.

Figure 10:
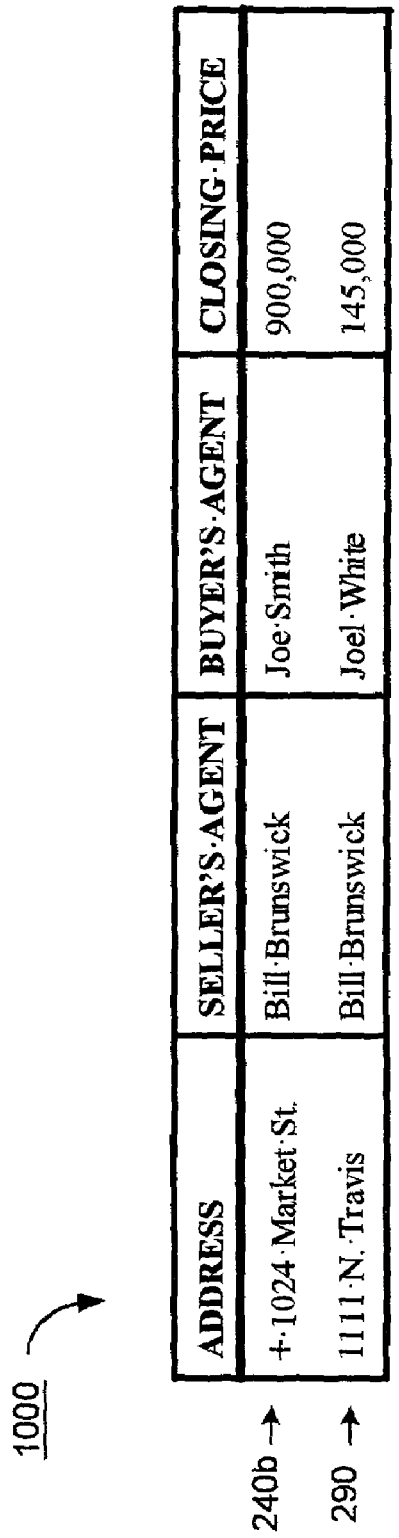
FIG. 10 is a block diagram of a list of objects which may be returned as a search result including a group representative, in accordance with an embodiment of the present invention; and, FIG. 11 is a block diagram of another embodiment of a list of objects which may be returned as a search result, in accordance with an embodiment of the present invention.

FIG. 10 illustrates a result of a search for all objects containing "Bill Brunswick" within the set 600 of FIG. 6, using the method of FIG. 9A, according to an embodiment of the present invention. Object 240*b* will be returned as the representative of the group containing the search terms, and object 290 will be returned. In an embodiment, a user may select the representative 240*b* and access the object of the group which contains the search terms. In another embodiment, upon selection of representative 240*b* the object that contains the search terms and all the other objects of the group may be viewed and accessed.

FIG. 11 illustrates another embodiment of the results of the same search. In this embodiment, representative 240*c* is produced along with the object 280*c* of the group which contains the search terms. The other objects of the group may be accessed by selecting the representative of the group. Upon selection of the representative 240*c*, the other objects of the group will be displayed in a fashion similar to that of object 280*c*. In such an embodiment, the object 280*c* includes an indication that it is the object of the group which contains the search terms.

Applications

The system described above may be used in multiple different computing environments, without changing current organization systems. Objects which have been grouped and assigned a representative may still be moved to different storage locations or folders. For example, if the invention is being used within a file storage system, files may be grouped using any of the methods described above and transferred or stored in any location. Each object of a group may be found in the same file folder or different file folders. In either situation, once the representative is selected, the other objects of that group are immediately accessible through the representative.

Allowing objects of a group to be stored in different locations but accessed from central interface not only improves organization, but allows objects of different types to be grouped together. For example, an object which is an email document stored in an e-mail system, may be grouped with a spreadsheet, a text document, and a news-group. By assigning one of these documents as the representative, they all become immediately accessible through the representative.

In addition to improving organization, displaying only the representatives of a group allows an individual to access information using a wider range of devices. In an embodiment, a user is able to access the system using a portable device which has a small display screen and wireless connection and quickly receive and display the representatives of several groups on the small display screen. By displaying the representatives and not every object, a user can quickly remember important activities or meetings, for which the representatives also serve as a reminder, without having to look through all the objects.

Although the present invention has been fully described in connection with embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of organizing a plurality of objects, comprising the steps of:
 receiving user selections of multiple objects from the plurality of objects;
 creating one or more groups of objects from the multiple objects;
 for each of the one or more groups of objects:
  assigning a set of property names to each of the objects in the group, for properties associated with objects in the group, and each object having the same set of property names;
  for each object in the group, assigning property values to the object for the property names, the property values determined from the object content;
 assigning a unique hidden property value for the group to each of the objects in the group;
 automatically designating a representative object for each of the groups of objects;
 searching the plurality of objects using a search parameter, and
  for the plurality of objects that meet the search parameter and that are part of one or more groups, returning the representative objects of groups of which any of the plurality of objects that meet the search parameter are members, such that the object is part of a particular one of the one or more groups, if the object was assigned the particular group's hidden property value; and
  for particular ones of the plurality of objects that meet the search parameter and that are not part of one or more groups, returning the particular objects, such that object is not part of the one or more groups if the object was not assigned any of the one or more groups' hidden property values;
 displaying the returned representative objects of the groups of objects, the returned representative objects improving organization of objects and saving display space; and
 displaying the particular objects.

2. The method of claim 1, wherein one or more of the plurality of objects comprises being part of more than one of the one or more groups of objects.

3. The method of claim 1, wherein the step of displaying the representative object of the group further includes not displaying the other objects of the group, and indicating that the object being displayed is a representative object of the group.

4. The method of claim 1, further including the steps of:
   detecting an additional object; and,
   adding the additional object to one or more of the groups of objects, responsive to the detecting step.

5. The method of claim 1, further comprising, for a returned representative object of a group, displaying objects of the group other than the representative object by selecting the representative object.

6. The method of claim 1, further comprising changing the representative object of any of the groups of objects.

7. The method of claim 1, wherein the step of designating a representative object is performed by designating the first object selected during the step of creating one or more groups of objects.

8. The method of claim 1, wherein each returned representative object is expandable to show all the members of the group and collapsible to show only the representative object.

9. An article of manufacture including an information storage medium wherein is stored information for programming a computer to perform a method of organizing a plurality of objects, the method comprising the steps of:
   receiving user selections of multiple objects from the plurality of objects;
   creating one or more groups of objects from the multiple objects;
   for each of the one or more groups of objects:
      assigning a set of property names to each of the objects in the group, for properties associated with objects in the group, and each object having the same set of property names;
      for each object in the group, assigning property values to the object for the property names, the property values determined from the object content;
   assigning a unique hidden property value for the group to each of the objects in the group;
   automatically designating a representative object for each of the groups of objects;
   searching the plurality of objects using a search parameter, and
   for the plurality of objects that meet the search parameter and that are part of one or more groups, returning the representative objects of groups of which any of the plurality of objects that meet the search parameter are members, such that the object is part of a particular one of the one or more groups, if the object was assigned the particular group's hidden property value; and
   for particular ones of the plurality of objects that meet the search parameter and that are not part of one or more groups, returning the particular objects, such that object is not part of the one or more groups if the object was not assigned any of the one or more groups' hidden property values;
   displaying the returned representative objects of the groups of objects, the returned representative objects improving organization of objects and saving display space; and
   displaying the particular objects.

10. An article of manufacture wherein information is stored for programming as in claim 9, wherein one or more of the plurality of objects comprises being part of more than one of the one or more groups of objects.

11. An article of manufacture wherein information is stored for programming as in claim 9, wherein the step of displaying the representative of the group further includes not displaying the other objects of the group, and indicating that the object being displayed is a representative object of the group.

12. The article of manufacture wherein information is stored for programming as in claim 9, further including the steps of:
    detecting an additional object; and
    adding the additional object to one or more of the groups of objects, responsive to the detecting step.

13. An article of manufacture wherein information is stored for programming as in claim 9, further comprising, for a returned representative object of a group, displaying objects of the group other than the representative object by selecting the representative object.

14. An article of manufacture wherein information is stored for programming as in claim 9, further comprising changing the representative object of any of the groups of objects.

15. The article of manufacture wherein information is stored for programming as in claim 9, wherein the step of designating a representative object is performed by designating the first object selected during the step of creating one or more groups of objects.

16. The article of manufacture wherein information is stored for programming as in claim 9, wherein each returned representative object is expandable to show all the members of the group and collapsible to show only the representative object.

17. An apparatus for organizing a plurality of objects, comprising:
    a processor;
    a display device in communication with the processor; and,
    a processor readable storage medium in communication with the processor, containing process readable program code for programming the apparatus to perform the method of organizing a plurality of objects, the method comprising the steps of:
    receiving user selections of multiple objects from the plurality of objects;
    creating one or more groups of objects from the multiple objects;
    for each of the one or more groups of objects:
       assigning a set of property names to each of the objects in the group, for properties associated with objects in the group, and each object having the same set of property names;
       for each object in the group, assigning property values to the object for the property names, the property values determined from the object content;
    assigning a uniciue hidden property value for the group to each of the objects in the group;
    automatically designating a representative object for each of the groups of objects;
    searching the plurality of objects using a search parameter, and
    for the plurality of objects that meet the search parameter and that are part of one or more groups, returning the representative objects of groups of which any of the plurality of objects that meet the search parameter are members, such that the object is part of a particular one of the one or more groups, if the object was assigned the particular group's hidden property value; and
    for particular ones of the plurality of objects that meet the search parameter and that are not part of one or more groups, returning the particular objects, such that object is not part of the one or more groups if the object was not assigned any of the one or more groups' hidden property values;
    displaying the returned representative objects of the groups of objects, the returned representative objects improving organization of objects and saving display space; and
    displaying the particular objects.

18. The apparatus of claim 17, wherein one or more of the plurality of objects comprises being part of more than one of the one or more groups of objects.

19. The apparatus of claim 17, wherein the step of displaying the representative object of the group further includes not displaying the other objects of the group, and indicating that the object being displayed is a representative object of the group.

20. The apparatus of claim 17, wherein the processor readable program code contained in the processor readable storage medium further includes the steps of:
   detecting a additional object; and,
   adding the additional object to one or more of the groups of objects, responsive to the detecting step.

21. The apparatus of claim 17, further comprising, for a returned representative object of a group, a displaying objects of the group other than the representative object by selecting the representative object.

22. The apparatus of claim 17, further comprising a change of the representative object of any of the groups of objects.

23. The apparatus of claim 17, wherein the step of designating a representative object is performed by designating the first object selected during the step of creating one or more groups of objects.

24. The apparatus of claim 17, wherein each returned representative object is expandable to show all the members of the group and collapsible to show only the representative object.

25. A method of organizing a plurality of objects, comprising the steps of:
   receiving user selections of multiple objects from the plurality of objects;
   creating one or more groups of objects from the multiple objects;
   for each of the one or more groups of objects:
      assigning a set of property names to each of the objects in the group, for properties associated with objects in the group, and each object having the same set of property names;
      for each object in the group, assigning property values to the object for the property names, the property values determined from the object content;
   assigning a uniciue hidden property value for the group to each of the objects in the group;
   automatically designating a representative object for each of the groups of objects;
   assigning a first value to each representative object;
   assigning a second value to the other objects in each of the groups of objects;
   searching the plurality of objects using a search parameter, and
   for the plurality of objects that meet the search parameter and that are part of one or more groups, returning the representative objects that are those objects having a first value, of groups of objects for which any of the plurality of objects that meet the search parameter are members, such that the object is part of a particular one of the one or more groups, if the object was assigned the particular group's hidden property value; and
   for particular ones of the plurality of objects that meet the search parameter and that are not part of one or more groups, returning the particular objects, such that object is not part of the one or more groups if the object was not assigned any of the one or more groups' hidden property values;
   displaying the returned representative objects of the groups of objects, the returned representative objects improving organization of objects and saving display space; and
   displaying the particular objects.

26. The method of claim 25, wherein one or more of the plurality of objects comprises being part of more than one of the one or more groups of objects.

27. The method of claim 25, wherein the step of displaying the representative object of the group further includes not displaying the other objects of the group, and indicating that the object being displayed is a representative object of the group.

28. The method of claim 25, further including the steps of:
   detecting an additional object;
   assigning the second value to the additional object; and,
   adding the additional object to one or more of the groups of objects, responsive to the detecting step.

29. The method of claim 25, further comprising, for a returned representative of a group, displaying objects of the group other than the representative object by selecting the representative object.

30. The method of claim 25, wherein the step of designating a representative object is performed by designating the first object selected during the step of creating one or more groups of objects.

31. The method of claim 25, wherein each returned representative object is expandable to show all the members of the group and collapsible to show only the representative object.

32. A method of organizing a plurality of objects, comprising the steps of:
   receiving user selections of multiple objects from the plurality of objects;
   creating one or more groups of objects from the multiple objects;
   designating a representative object for each of the groups of objects;
   assigning a first value to each representative object;
   assigning a second value to the other objects in each of the groups of objects;
   searching the plurality of objects using a search parameter, and
   for the plurality of objects that meet the search parameter and that are part of one or more groups, returning the representative objects that are those objects having a first value, or groups of objects for which any of the plurality of objects that meet the search parameter are members; and
   for particular ones of the plurality of objects that meet the search parameter and that are not part of one or more groups, returning the particular objects;
   displaying the returned representative objects of the groups of objects, the returned representative objects improving organization of objects and saving display space;
   displaying the particular objects;
   changing the representative object of a particular one of the groups of objects;
   assigning the first value to the changed representative object; and
   assigning the second value to the other objects in the particular group of objects.

* * * * *